US009446450B2

(12) United States Patent
Yamamoto

(10) Patent No.: US 9,446,450 B2
(45) Date of Patent: Sep. 20, 2016

(54) CUTTING INSERT, CUTTING TOOL, AND METHOD FOR MANUFACTURING CUT WORKPIECE USING SAME

(75) Inventor: Masahiro Yamamoto, Moriyama (JP)

(73) Assignee: KYOCERA CORPORATION, Kyoto-Shi, Kyoto (JP)

( * ) Notice: Subject to any disclaimer, the term of this patent is extended or adjusted under 35 U.S.C. 154(b) by 244 days.

(21) Appl. No.: 14/140,172

(22) PCT Filed: Jun. 28, 2012

(86) PCT No.: PCT/JP2012/066578
§ 371 (c)(1), (2), (4) Date: Dec. 24, 2013

(87) PCT Pub. No.: WO2013/002341
PCT Pub. Date: Jan. 3, 2013

(65) Prior Publication Data

US 2014/0178135 A1 Jun. 26, 2014

(30) Foreign Application Priority Data

Jun. 30, 2011 (JP) ................................ 2011-145347

(51) Int. Cl.
*B23C 5/00* (2006.01)
*B23B 27/16* (2006.01)
(Continued)

(52) U.S. Cl.
CPC .......... *B23B 27/1611* (2013.01); *B23C 5/109* (2013.01); *B23C 5/207* (2013.01);
(Continued)

(58) Field of Classification Search
CPC ................. Y10T 407/1924; Y10T 407/1942; Y10T 407/1946; Y10T 407/1956; Y10T 407/1962; Y10T 407/1964; Y10T 407/1936; Y10T 407/23; B23C 2210/084; B23C 2200/08; B23C 2200/083; B23C 2200/085; B23C 2200/12; B23C 2200/125; B23C 2200/20; B23C 2200/203; B23C 2200/28; B23C 2200/286; B23C 2210/04; B23C 2210/045; B23B 27/16; B23B 27/1611
USPC ....... 407/42, 51, 53, 58, 59, 61, 62, 113, 48, 407/114
See application file for complete search history.

(56) References Cited

U.S. PATENT DOCUMENTS 3,541,655 A 11/1970 Stier
5,544,984 A * 8/1996 Pantzar .................. B23C 5/207 407/113

(Continued)

FOREIGN PATENT DOCUMENTS

CN 1124474 A 6/1996
JP 09225724 A * 9/1997

(Continued)

OTHER PUBLICATIONS

Concise explanation of the Office Action issued in the corresponding Chinese Patent Application No. 201280031603.7 dated Apr. 3, 2015.

(Continued)

*Primary Examiner* — Daniel Howell
*Assistant Examiner* — Nicole N Ramos

(57) ABSTRACT

A cutting insert, a cutting tool and method of manufacturing a machined product. The cutting insert includes: upper and lower surfaces; a side surface; a cutting edge; and a rake portion on the upper surface. The cutting edge includes major and minor cutting edges that are convex toward outside of the main body portion. The minor cutting edge has a curvature radius smaller than a curvature radius of the major cutting edge. The rake portion is inclined and approaches the lower surface as moving from the major cutting edge toward inside of the main body portion and is located along the major cutting edge. An inclination angle of the rake portion becomes smaller as moving from a part continuous with one end of the major cutting edge toward a part continuous with center of the major cutting edge.

14 Claims, 16 Drawing Sheets

(51) Int. Cl.
*B23C 5/10* (2006.01)
*B23C 5/20* (2006.01)

(52) U.S. Cl.
CPC .... *B23C2200/125* (2013.01); *B23C 2200/128* (2013.01); *B23C 2200/203* (2013.01); *B23C 2200/286* (2013.01); *B23C 2210/045* (2013.01); *Y10T 407/1924* (2015.01); *Y10T 407/235* (2015.01); *Y10T 407/245* (2015.01); *Y10T 409/303808* (2015.01)

(56) References Cited

U.S. PATENT DOCUMENTS 5,695,303 A 12/1997 Boianjiu et al.
5,810,521 A * 9/1998 Pantzar ................ B23B 27/145 407/114
2004/0037659 A1* 2/2004 Sung ...................... B23C 5/202 407/114
2004/0165961 A1* 8/2004 Nagaya .................. B23C 5/207 407/113
2005/0084342 A1* 4/2005 Festeau .................. B23C 5/202 407/113
2006/0210364 A1 9/2006 Bellmann et al.
2008/0304924 A1* 12/2008 Engstrom .............. B23C 5/202 407/114
2010/0028092 A1 2/2010 Choi et al.
2010/0054873 A1* 3/2010 Men ....................... B23C 5/202 407/42
2010/0111619 A1* 5/2010 Ballas .................. B23C 5/2213 407/40
2010/0202839 A1* 8/2010 Fang ...................... B23C 5/109 407/53
2011/0091294 A1* 4/2011 Michelet .................. B23C 5/06 407/42
2012/0087749 A1* 4/2012 Uno ........................ B23C 5/06 407/42
2012/0093596 A1 4/2012 Ishi
2012/0189396 A1 7/2012 Xu
2013/0302099 A1* 11/2013 Choi ........................ B23C 5/08 407/113

FOREIGN PATENT DOCUMENTS

JP 2010517802 5/2010
WO 2005065874 7/2005
WO 2008099984 A1 8/2008
WO 2008120186 10/2008
WO 2010023659 3/2010
WO 2011001939 A1 * 1/2011
WO 2011052340 A1 5/2011
WO 2011009572 * 8/2012

OTHER PUBLICATIONS

English Translation of International Search Report issued in PCT/JP2012/066578 dated Jul. 30, 2012.

* cited by examiner (a)

(b)

CUTTING INSERT, CUTTING TOOL, AND METHOD FOR MANUFACTURING CUT WORKPIECE USING SAME

CROSS-REFERENCE TO RELATED APPLICATIONS

This application is a national phase of the International application PCT/JP2012/066578 filed Jun. 28, 2012 that claims priority from the Japanese patent application JP2011-145347 filed Jun. 30, 2011. The content of these aforementioned documents is herewith incorporated by reference.

TECHNICAL FIELD OF THE INVENTION

The present invention relates to a cutting insert, a cutting tool, and a method of manufacturing a cut workpiece using same.

BACKGROUND ART OF THE INVENTION

In machining of metal materials so-called difficult-to-cut materials such as heat resistant alloys and high hardness materials (hereinafter simply referred to as machining of difficult-to-cut materials), a cutting insert having a cutting edge that is arcuate in plan view, such as that disclosed in International Publication No. 2010/023659, is used. Such a cutting insert is advantageous in machining of difficult-to-cut materials compared to the case of a cutting edge that is linear in plan view, from the viewpoint that generated chips are thin and that the cutting edge strength is high.

However, generated chips become thicker with the increase in depth of cut, and therefore, even when the cutting insert described above is used, cutting resistance may increase and the cutting edge may become liable to fracture.

PTL 1: International Publication No. 2010/023659

SUMMARY OF INVENTION

A cutting insert according to an embodiment of the present invention includes a main body portion that includes: an upper surface; a lower surface; a side surface connected to the upper surface and the lower surface; and a cutting edge located at the intersection of the upper surface and the side surface. The cutting edge includes: an arcuate major cutting edge that is convex toward outside of the main body portion; and an arcuate minor cutting edge that is convex toward the outside of the main body portion and that has a curvature radius smaller than a curvature radius of the arcuate major cutting edge. The upper surface includes a first rake portion that is inclined so as to approach the lower surface as moving from the arcuate major cutting edge toward inside of the main body portion and that is provided along the arcuate major cutting edge. An inclination angle of the first rake portion becomes smaller as moving from a part continuous with one end of the arcuate major cutting edge toward a part continuous with center of the arcuate major cutting edge.

A cutting tool according to an embodiment of the present invention includes the cutting insert according to the above-described embodiment, and a cylindrical holder having a rotation center axis. The cutting insert is attached to the holder such that the arcuate major cutting edge protrudes from the outer peripheral surface of the holder.

A method of manufacturing a machined product of the present invention includes steps of: rotating the cutting tool according to the above-described embodiment; bringing the cutting edge of the rotating cutting tool into contact with a workpiece and cutting the workpiece; and separating the cutting edge of the rotating cutting tool from the workpiece.

BRIEF DESCRIPTION OF DRAWINGS

FIG. 3 (*b*) is a side view of the cutting insert shown in FIG. 2 as seen from the direction of arrow B.

FIG. 13 (*b*) is a plan view of the region shown in FIG. 13 (*a*).

FIG. 14 (*b*) is a side view of the cutting tool shown in FIG. 14 (*a*). FIG. 14 (*c*) is a partial enlarged view of the region K shown in FIG. 14 (*a*).

DETAILED DESCRIPTION OF THE DRAWINGS

<Cutting Insert>

A cutting insert 1 (hereinafter simply referred to as insert 1) that is an example of an embodiment of the present invention will be described below with reference to FIG. 1 to FIG. 11.

Figure 1:
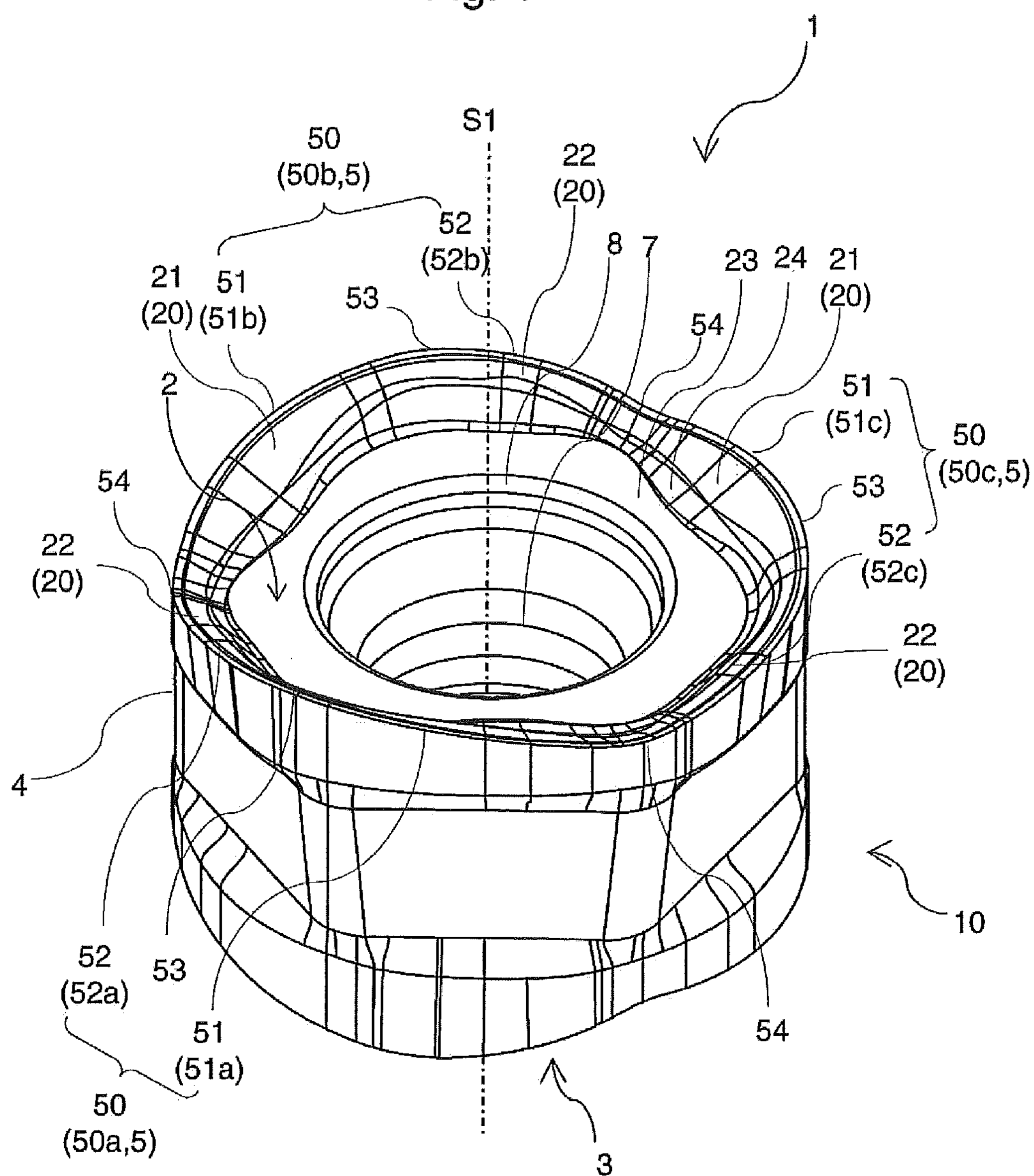
FIG. 1 is a perspective view showing an example of an embodiment of a cutting insert of the present invention.
Figure 2:
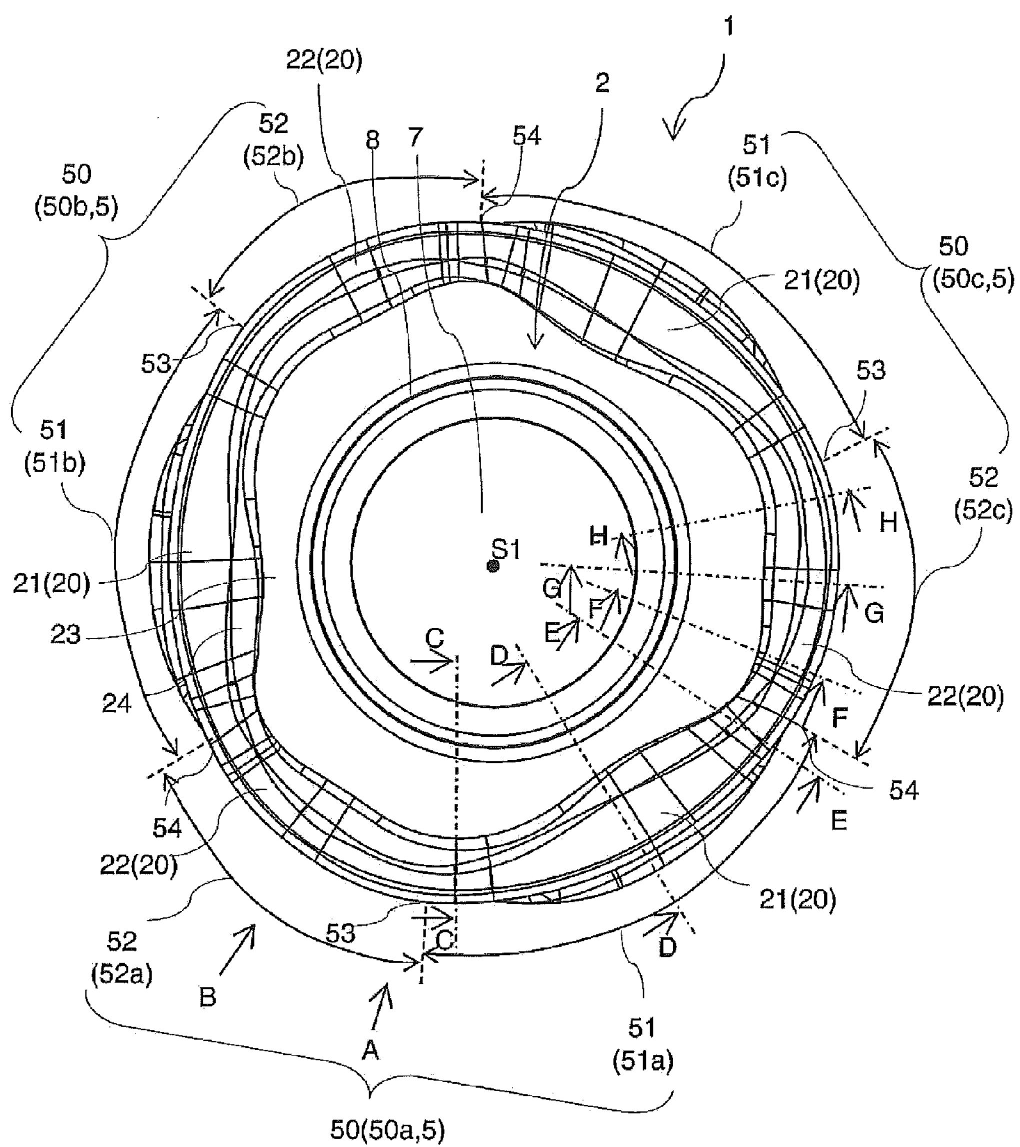
FIG. 2 is a plan view of the cutting insert shown in FIG. 1.

The insert 1 that is an example of an embodiment of the present invention includes a main body portion 10 having an upper surface 2, a lower surface 3, and a side surface 4 connected to the upper surface 2 and the lower surface 3. In this example, as shown in FIG. 1 and FIG. 2, the main body portion 10 is plate-like. The shape of the main body portion 10 is, in plan view, for example, a circular or polygonal such as triangular, quadrangular, pentagonal, hexagonal, or octagonal shape. These shapes are shapes that those skilled in the art usually use for an insert. In this example, specifically, the main body portion 10 is substantially circular. In this example, the dimensions of the main body portion 10 is such that the maximum width of the upper surface 2 is 5 mm to 20 mm and the height from the lower surface 3 to the upper surface 2 is 2 mm to 8 mm. A cutting edge 5 is located at the intersection of the upper surface 2 and the side surface 4.

Examples of the material of the insert 1 include cemented carbide and cermet. Examples of the composition of the cemented carbide include WC—Co produced by adding powder of cobalt (Co) to tungsten carbide (WC) followed by sintering, WC—TiC—Co obtained by adding titanium carbide (TiC) to WC—Co, and WC—TiC—TaC—Co obtained by adding tantalum carbide (TaC) to WC—TiC—Co. The cermet is a sintered composite material obtained by combining a ceramic component with metal, and specific examples thereof are titanium compounds composed mainly of titanium carbide (TiC) or titanium nitride (TiN).

The surface of the insert 1 may be coated using a chemical vapor deposition (CVD) method or a physical vapor deposition (PVD) method. Examples of the composition of the coating include titanium carbide (TiC), titanium nitride (TiN), titanium carbonitride (TiCN), or alumina ($Al_2O_3$).

A region of the upper surface 2 along the cutting edge 5 functions as a rake surface scraped by chips. A region of the side surface 4 along the cutting edge 5 functions as a flank surface.

In plan view, the cutting edge 5 includes arcuate major cutting edges 51 that are convex toward the outside of the main body portion 10 and that have a curvature radius r1, and arcuate minor cutting edges 52 that are convex toward the outside of the main body portion 10 and that have a curvature radius r2. The curvature radius r2 of the arcuate minor cutting edges 52 is smaller than the curvature radius r1 of the arcuate major cutting edges 51. That is, r1>r2. Specifically, in this example, the curvature radius of the arcuate major cutting edges 51 is 6.0 mm, and the curvature radius of the arcuate minor cutting edges 52 is 4.5 mm. As described above, the insert 1 has a cutting blade 5 having a plurality of curvature radii, and therefore the formation of a complex curved surface, such as three-dimensional machining, can be easily performed.

In this example, as shown in FIG. 2, in plan view, the length of the arcuate major cutting edges 51 is larger than the length of the arcuate minor cutting edges 52. With this configuration, the arcuate major cutting edges 51 functioning as major cutting edges can be secured to be longer than the arcuate minor cutting edges 52 functioning as minor cutting edges.

Figure 3:
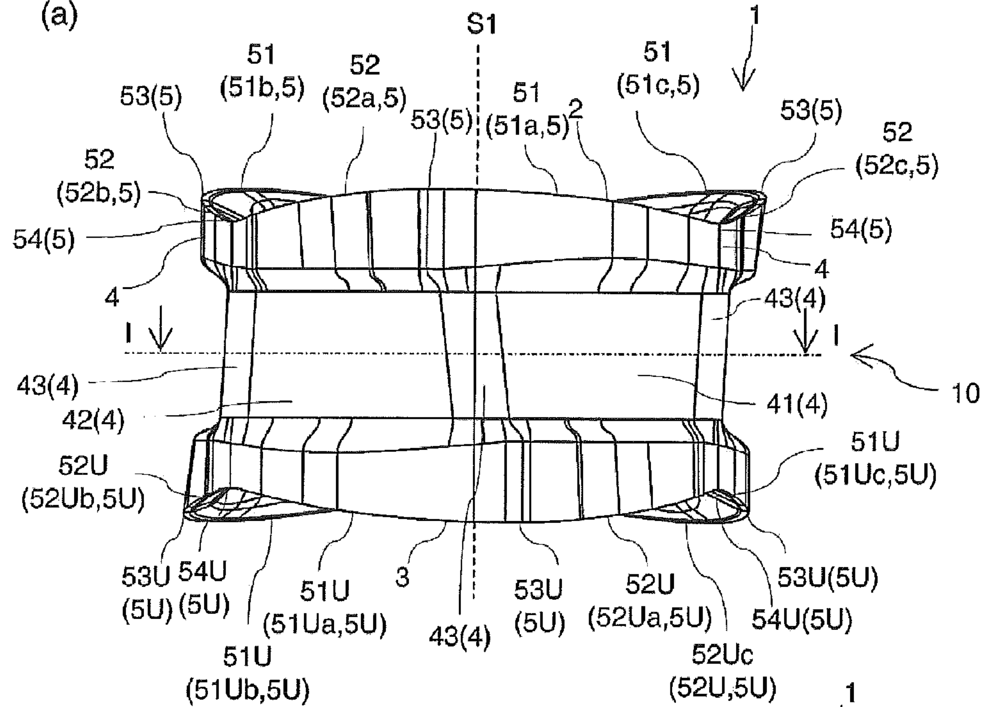
FIG. 3 (*a*) is a side view of the cutting insert shown in FIG. 2 as seen from the direction of arrow A.
Figure 3:
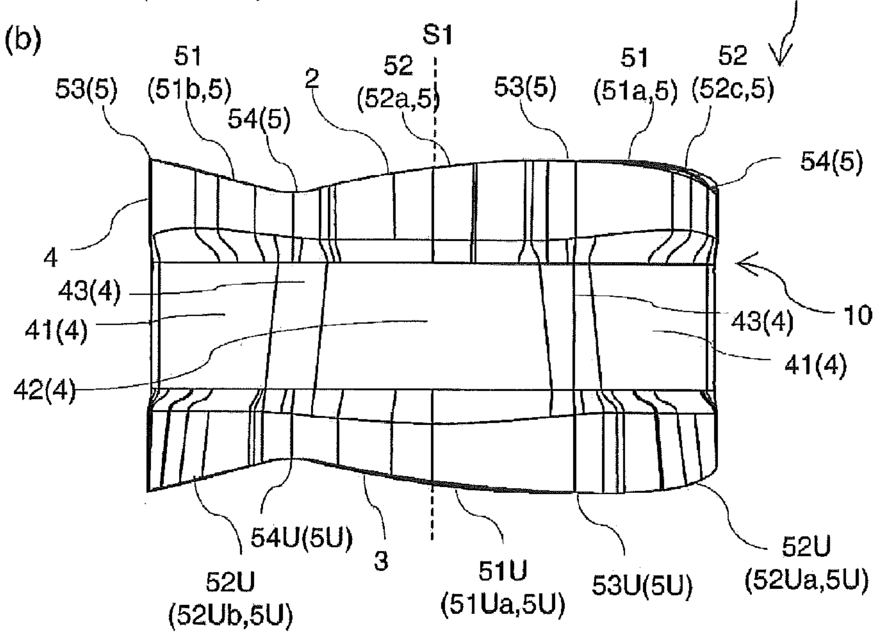

As shown in FIG. 3, the arcuate major cutting edges 51 are inclined so as to approach the lower surface 3 with increasing distance from the arcuate minor cutting edges 52. The arcuate minor cutting edges 52 are inclined so as to approach the lower surface 3 with increasing distance from the arcuate major cutting edges 51. With this configuration, the area of contact with a workpiece is reduced, and cutting resistance is reduced.

Therefore, relative vibration (hereinafter referred to as "chatter vibration") caused between the arcuate major cutting edges 51 and the arcuate minor cutting edges 52 and the workpiece can be prevented. As a result, the insert 1 is suitable for cutting requiring machined surface accuracy, such as profile machining. In addition, heat generation at the time of cutting is prevented by the reduction in contact area, and the insert 1 is suitable for the machining of difficult-to-cut materials such as heat resistant alloys and high hardness materials.

As shown in FIG. 3, the highest points 53 of the cutting edge 5 that is farthest from the lower surface 3 are located between the arcuate major cutting edge 51 and the arcuate minor cutting edge 52. Specifically, the highest points 53 farthest from the lower surface 3 are located between the higher end of the arcuate major cutting edge 51 and the higher end of the arcuate minor cutting edge 52. That is, the higher end of the arcuate major cutting edge 51 and the higher end of the arcuate minor cutting edge 52 are located at the same height from the lower surface 3. With this configuration, the highest points 53 function as corner portions between the arcuate major cutting edge 51 and the arcuate minor cutting edge 52 and easily engage into the workpiece, cutting resistance is reduced, and chatter vibration can be prevented.

As shown in FIG. 3, the lowest points 54 of the cutting edge 5 nearest to the lower surface 3 are located at the lower end of each arcuate major cutting edge 51 and the lower end of each arcuate minor cutting edge 52. That is, the lower end of each arcuate major cutting edge 51 and the lower end of each arcuate minor cutting edge 52 are located at the same height from the lower surface 3. With this configuration, the maximum depth of cut of the arcuate major cutting edges 51 is equal to the maximum depth of cut of the arcuate minor cutting edge 52.

In this example, as shown in FIG. 3 (*a*), in side view, the arcuate major cutting edges 51 and the arcuate minor cutting edges 52 are curved toward a side away from the lower surface 3. With this configuration, thrust force can be well distributed, and fracture of the arcuate major cutting edges 51 and the arcuate minor cutting edges 52 can be prevented. Although, in this example, they are formed of a curved line having a curvature radius of 15 mm, they may be formed of a plurality of curved lines having a plurality of curvature radii.

As shown in FIG. 1 and FIG. 2, the upper surface 2 has a rake surface 20 that is continuous with the cutting edge 5 and that is inclined so as to approach the lower surface 3 as moving from the cutting edge 5 toward the inside of the main body portion. The rake surface 20 is involved in the thickness of chips generated by the cutting edge 5. In general, the thickness of chips tends to decreases with increasing rake angle. Since the upper surface 2 has the rake surface 20 continuous with the cutting edge 5, the engagement of the cutting edge 5 into the workpiece is good, and cutting resistance can be reduced.

In this example, as shown in FIG. 1 and FIG. 2, in order to enhance the strength of the cutting edge 5, a flat land 6 is provided at the intersection of the cutting edge 5 and the rake surface 20. The width of the land 6 is appropriately set in accordance with cutting conditions, and is 0.12 mm in this example. In this example, since the cutting edge 5 is arcuate, chips generated by the cutting edge 5 are thin compared to a linear cutting edge. Therefore, chips are easily spirally curled by scraping the rake surface 20. That is, the chip ejection direction is controlled by the rake surface 20. If it is difficult to control the chip ejection direction owing to cutting conditions, it is recommended to separately provide a recess or protrusion on the upper surface 2 and to appropriately design the breaker shape.

The upper surface 2 includes first rake portions 21 that are inclined so as to approach the lower surface 3 as moving from the arcuate major cutting edges 51 toward the inside of the main body portion 10 and that are provided along the arcuate major cutting edges 51. The inclination angle of the first rake portions 21 becomes smaller as moving from a part continuous with one end of the arcuate major cutting edge 51 toward a part continuous with the center of the arcuate major cutting edge 51. With this configuration, the cutting edge strength of each arcuate major cutting edge 51 becomes stronger as moving from one end of each arcuate major cutting edge 51 toward the center thereof. Therefore, the fracture of the arcuate major cutting edges 51 can be prevented even in machining in which the depth of cut of the arcuate major cutting edges 51 increases.

In particular, when, like the first rake portions in this example, the inclination angle becomes smaller as moving from a part continuous with one end of the arcuate major cutting edge toward a part continuous with the other end of the arcuate major cutting edge, the fracture of the arcuate major cutting edges 51 can be prevented even in machining in which the depth of cut of the arcuate major cutting edges 51 further increases.

Figure 4:
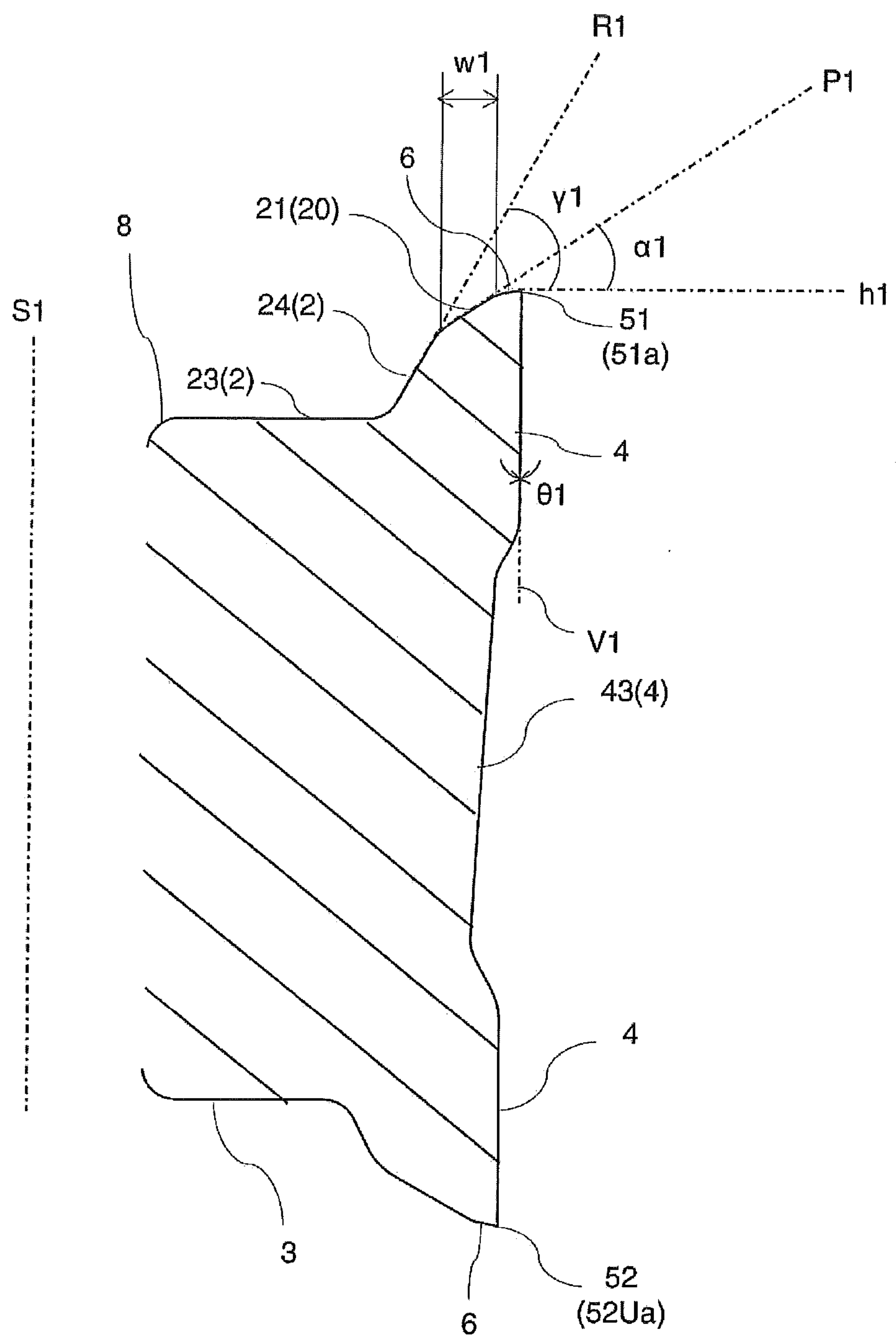
FIG. 4 is a sectional view of the cutting insert shown in FIG. 2 taken along line C-C.
Figure 5:
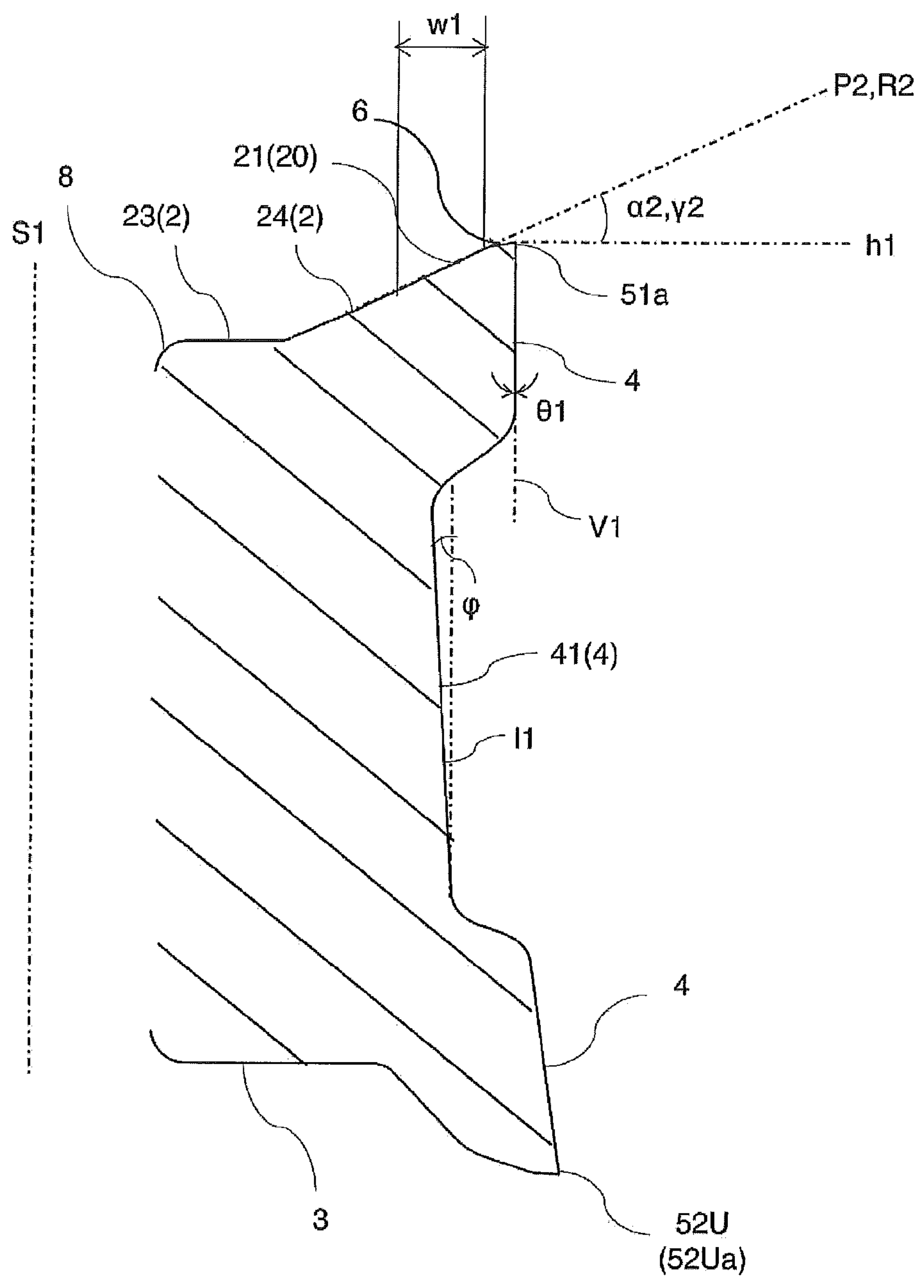
FIG. 5 is a sectional view of the cutting insert shown in FIG. 2 taken along line D-D.
Figure 6:
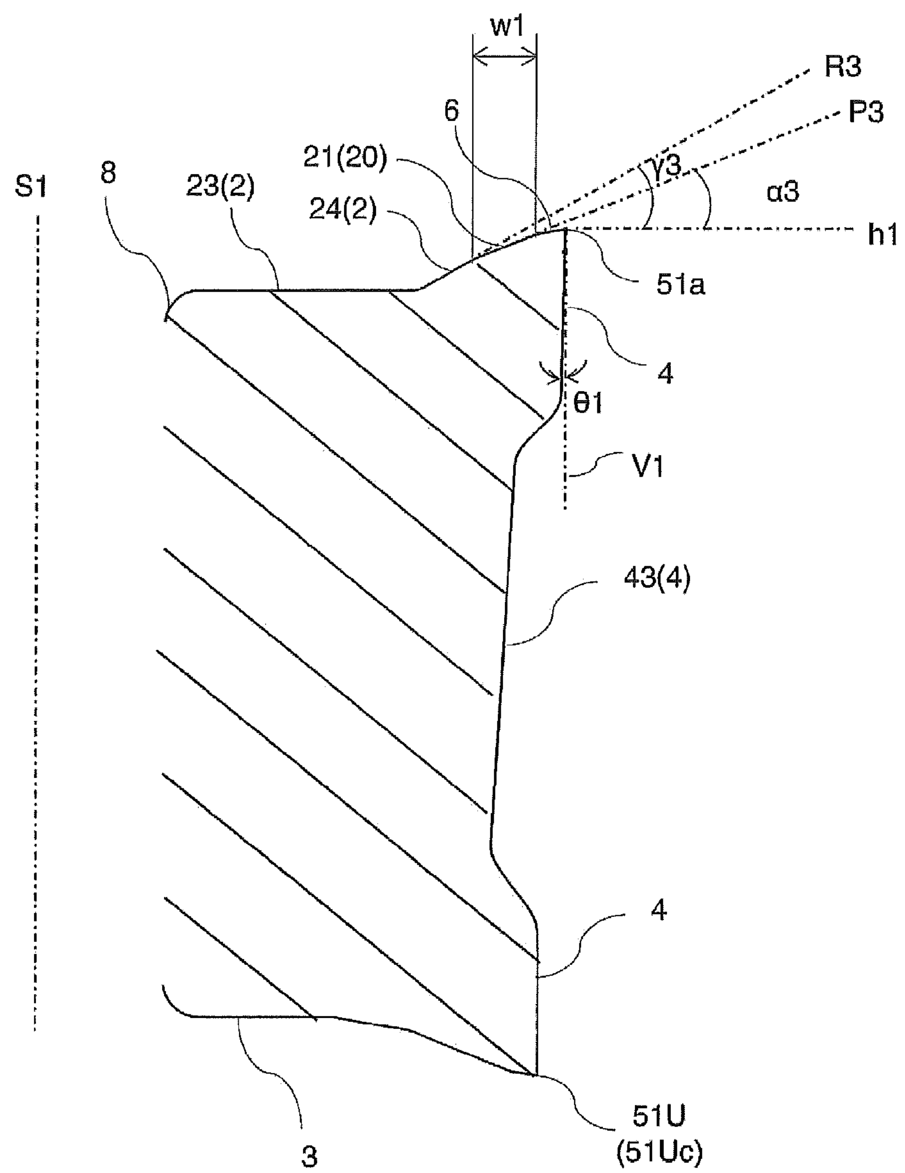
FIG. 6 is a sectional view of the cutting insert shown in FIG. 2 taken along line E-E.

FIG. 4 shows a cross section in the normal direction of one end of one of the arcuate major cutting edges 51. FIG. 5 shows a cross section in the normal direction of the center of the arcuate major cutting edge 51. FIG. 6 shows a cross section in the normal direction of the other end of the arcuate major cutting edge 51.

In this example, specifically, the angle between a virtual extension line P1 of the end of the first rake portion 21 shown in FIG. 4 nearer to the arcuate major cutting edge 51 and a reference plane h1 parallel to a horizontal plane passing through the arcuate major cutting edge 51 is denoted as $\alpha 1$. The angle between a virtual extension line P2 of the end of the first rake portion 21 shown in FIG. 5 nearer to the arcuate major cutting edge 51 and the reference plane h1 parallel to a horizontal plane passing through the arcuate major cutting edge 51 is denoted as $\alpha 2$. The angle between a virtual extension line P3 of the end of the first rake portion 21 shown in FIG. 6 nearer to the arcuate major cutting edge 51 and the reference plane h1 parallel to a horizontal plane passing through the arcuate major cutting edge 51 is denoted as $\alpha 3$.

At this time, $\alpha 1 > \alpha 2 > \alpha 3$. The angles $\alpha 1$, $\alpha 2$, $\alpha 3$ are appropriately set from the range of 10° to 40°. In this example, specifically, $\alpha 1 = 32°$, $\alpha 2 = 25°$, and $\alpha 3 = 21°$. Since FIG. 4 to FIG. 6 are all side views, the horizontal plane h1 is represented by a straight line.

In plan view, the first rake portions 21 are nearest to the inside of the main body portion (rotation center axis S1) in a region corresponding to the center of the arcuate major cutting edge 51, and are farthest from the inside of the main body portion (rotation center axis S1) in regions corresponding to both ends of the arcuate major cutting edge 51. Specifically, in this example, as shown in FIG. 4 to FIG. 6, the length w1 in the normal direction of the arcuate major cutting edge 51 is largest in a region corresponding to the center of the arcuate major cutting edge 51, and is smallest in regions corresponding to both ends of the arcuate major cutting edge 51. With such a configuration, the contact area between generated chips and the upper surface 2 is reduced, and the reduction in cutting resistance can be promoted. As a result, the fracture of the arcuate major cutting edges 51 is further prevented.

The upper surface 2 has, along the arcuate minor cutting edges 52, second rake portions 22 that are inclined so as to approach the lower surface 3 as moving from the arcuate minor cutting edges 52 toward the inside of the main body portion. The inclination angle of the second rake portions 22 becomes smaller as moving from a part continuous with one end of the arcuate minor cutting edge 52 toward a part continuous with the center of the arcuate minor cutting edge 52. With this configuration, the cutting edge strength of each arcuate minor cutting edge 52 becomes stronger as moving from one end of each arcuate minor cutting edge 52 toward the center thereof. Therefore, the fracture of the arcuate minor cutting edges 52 can be prevented even in machining in which the depth of cut of the arcuate minor cutting edges 52 increases.

Figure 7:
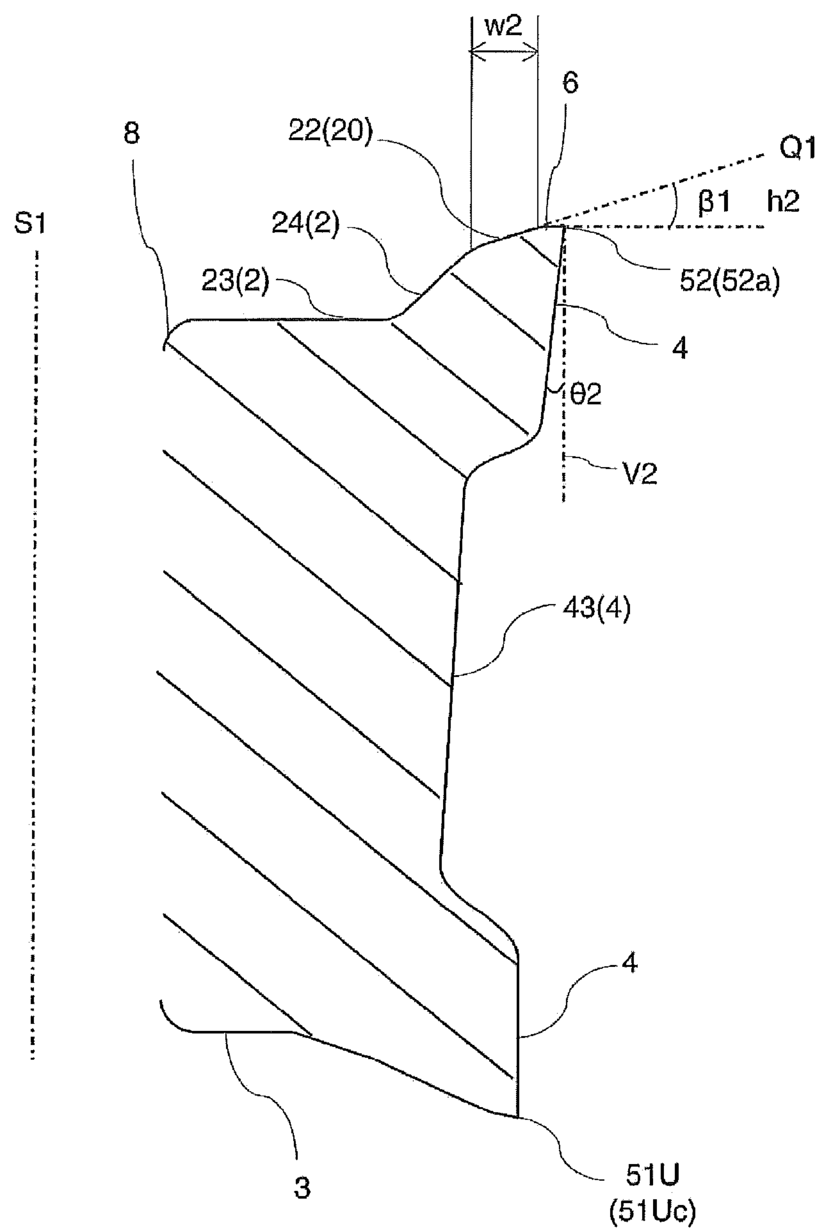
FIG. 7 is a sectional view of the cutting insert shown in FIG. 2 taken along line F-F.
Figure 8:
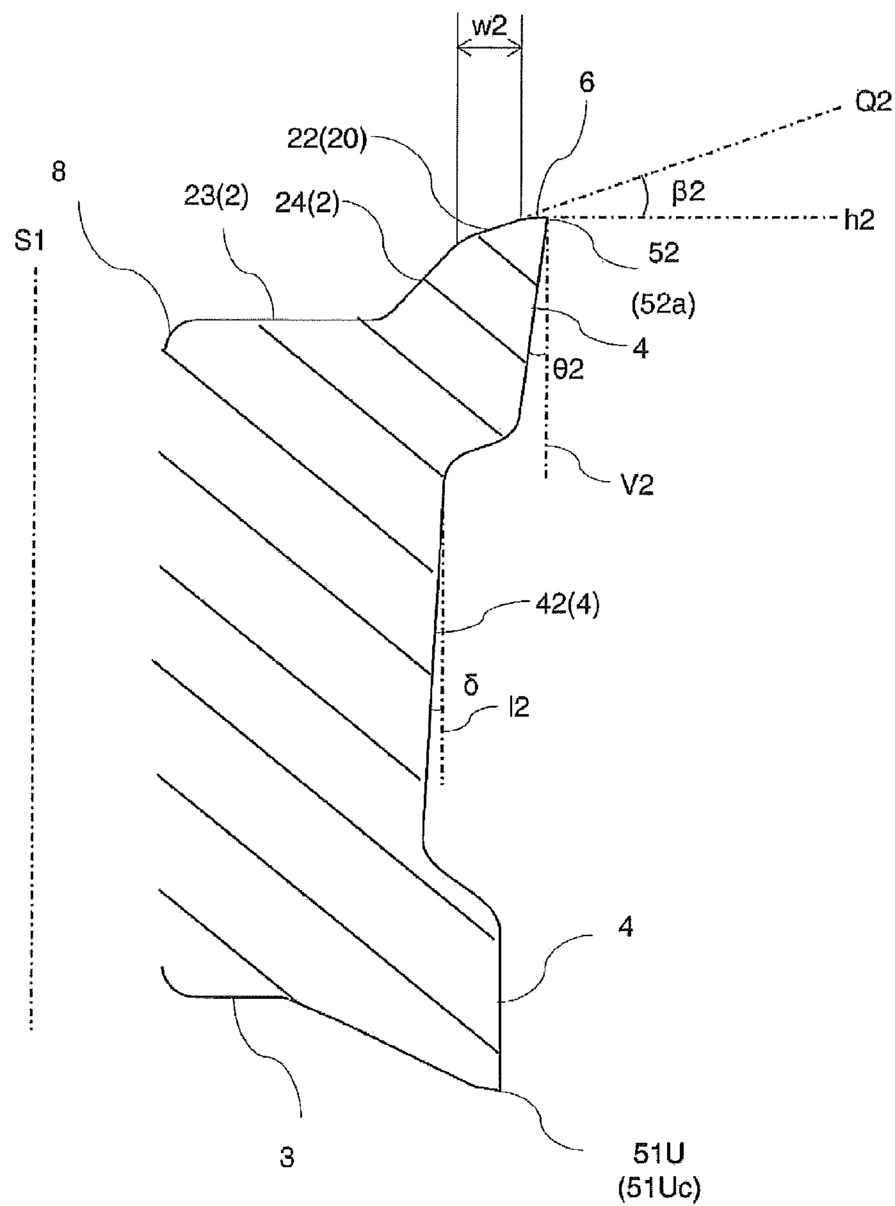
FIG. 8 is a sectional view of the cutting insert shown in FIG. 2 taken along line G-G.
Figure 9:
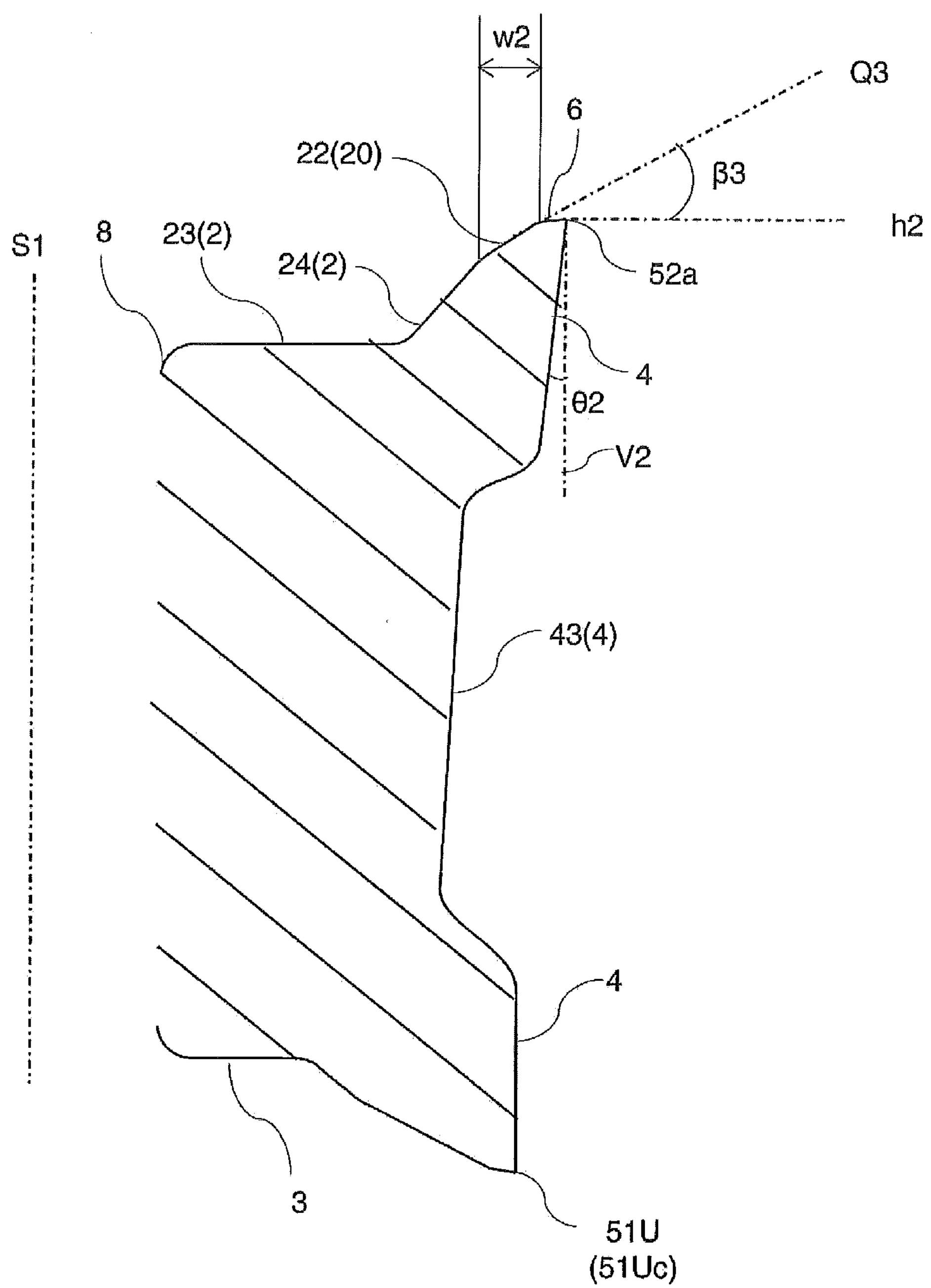
FIG. 9 is a sectional view of the cutting insert shown in FIG. 2 taken along line H-H.

FIG. 7 shows a cross section in the normal direction of one end of one of the arcuate minor cutting edges 52. FIG. 8 shows a cross section in the normal direction of the center of the arcuate minor cutting edge 52. FIG. 9 shows a cross section in the normal direction of the other end of the arcuate minor cutting edge 52.

In this example, specifically, the angle between a virtual extension line Q1 of the end of the second rake portion 22 shown in FIG. 7 nearer to the arcuate minor cutting edge 52 and a reference plane h2 parallel to a horizontal plane passing through the arcuate minor cutting edge 52 is denoted as $\beta 1$. The angle between a virtual extension line Q2 of the end of the second rake portion 22 shown in FIG. 8 nearer to the arcuate minor cutting edge 52 and the reference plane h2 parallel to a horizontal plane passing through the arcuate minor cutting edge 52 is denoted as $\beta 2$. The angle between a virtual extension line Q3 of the end of the second rake portion 22 shown in FIG. 9 nearer to the arcuate minor cutting edge 52 and the reference plane h2 parallel to a horizontal plane passing through the arcuate minor cutting edge 52 is denoted as $\beta 3$.

At this time, $\beta 1 < \beta 2 < \beta 3$. The angles $\beta 1$, $\beta 2$, and $\beta 3$ are appropriately set from the range of 10° to 40°. Since FIG. 7 to FIG. 9 are all side views, the horizontal plane h2 is represented by a straight line.

In plan view, the width of the second rake portions 22 from the arcuate minor cutting edges 52 to the inside of the main body portion is substantially constant. With this configuration, the stability of the direction in which generated chips are ejected can be improved. In this example, the width of the second rake portions 22 from the arcuate minor cutting edge 52 to the inside of the main body portion means the length in the normal direction of the arcuate minor cutting edge 52. The above width is specifically w2 shown in FIG. 7 to FIG. 9. It is clear that the width w2 of the second rake parts 22 is substantially constant over the entire length of the second rake portions 22. The term "substantially constant" is defined to mean that the variation in size is ±2 mm.

In this example, as shown in FIG. 1 and FIG. 2, the main body portion 10 has, in its center, a through-hole 7 penetrating the upper surface 2 and the lower surface 3. The cutting edge 5 has a plurality of cutting portions 50 each of which includes the arcuate major cutting edge 51 and the arcuate minor cutting edge 52 around the through-hole 7. The through-hole 7 is a hole for inserting an attaching screw for attaching to a holder (to be described later). With this configuration, the insert 1 can be rotated about the through hole 7, each of the plurality of cutting portions can be used for cutting, and economic efficiency is improved.

Specifically, as shown in FIG. 2, three cutting portions 50 (50*a*, 50*b*, 50*c*) are formed around the through-hole 7. Each cutting portion has one arcuate major cutting edge 51 and one arcuate minor cutting edge 52. That is, the cutting edge 5 has three arcuate major cutting edges 51 (51*a*, 51*b*, 51*c*) and three arcuate minor cutting edges 52 (52*a*, 52*b*, 52*c*). In this example, in plan view, arcuate major cutting edges 51*a*, 51*b*, and 51*c* and arcuate minor cutting edges 52*a*, 52*b*, and 52*c* are alternately arranged in the order of the arcuate major cutting edge 51*a*, the highest point 53, the arcuate minor cutting edge 52*a*, the lowest point 54, the arcuate major cutting edge 51*b*, . . .

Here, the shape formed by alternately arranging the arcuate major cutting edges 51 and the arcuate minor cutting edges 52 is not particularly limited. For example, in the case where the shape of the main body portion 10 is a polygonal shape in plan view, the polygonal shape may be formed by disposing an arcuate major cutting edge 51 on each side of the upper surface 2 and disposing an arcuate minor cutting edge 52 on each corner of the upper surface 2.

In this example, the upper surface 2 is substantially triangular as shown in FIG. 2, and has three arcuate major cutting edges 51 (51*a*, 51*b*, 51*c*) on three sides and three arcuate minor cutting edges 52 (52*a*, 52*b*, 52*c*) on three corners. By arranging the arcuate major cutting edges 51 and arcuate minor cutting edges 52 in a polygonal shape in plan view as described above, the increase in size of the insert 1 caused by the increase in curvature radii of arcuate major cutting edges 51 and arcuate minor cutting edges 52 can be prevented.

The shape of the cutting edge 5 may be different from the above-described shape. The cutting edge 5 in this example has a plurality of arcuate major cutting edges 51 and a plurality of arcuate minor cutting edges 52, and one arcuate minor cutting edge 52 is disposed between each adjacent two of the arcuate major cutting edges 51. As described above, the cutting edge in this example is formed only of arcuate major cutting edges 51 and arcuate minor cutting edges 52. However, the configuration of the cutting edge is not limited to such a configuration. For example, the cutting edge may be configured such that it has a linear cutting edge between an arcuate major cutting edge 51 and an arcuate minor cutting edge 52.

Alternatively, the cutting edge may be configured such that a linear cutting edge is located between each adjacent two of a plurality of arcuate major cutting edges 51, and an arcuate minor cutting edge 52 is located between each arcuate major cutting edge 51 and the linear cutting edge. In such a case, the cutting edges 5 are arranged in the order of arcuate major cutting edge 51, arcuate minor cutting edge 52, linear cutting edge, arcuate minor cutting edge 52, arcuate major cutting edge 51, . . . The above “arcuate” and “linear” mean shapes when viewed from above. Therefore, it is not intended to require that they be “arcuate” and “linear” even when they are viewed from the side.

As shown in FIG. 2, the upper surface 2 has a flat surface 23 located nearer to the inside of the main body portion 10 than the first rake portions 21 and the second rake portions 22. The flat surface 23 is perpendicular to the rotation center axis S1. The flat surface 23 is lower than the first rake portions 21 and the second rake portions 22. In plan view, the flat surface 23 is farthest from the arcuate major cutting edges 51 in the center of each arcuate major cutting edge 51. With this configuration, the cutting edge strength of the center of each arcuate major cutting edge 51 can be improved, and chatter vibration can be prevented.

As shown in FIG. 2, the upper surface 2 has a stepped portion 24 that is located between the flat surface 23 and the first rake portions 21 and the second rake portions 22. The stepped portion 24 is inclined so as to approach the lower surface 3 toward the inside of the main body portion. The inclination angle of the stepped portion 24 becomes smaller with increasing distance from the arcuate minor cutting edges 52. Further, in the regions corresponding to the centers of the plurality of arcuate major cutting edges 51, the inclination angle of the stepped portion 24 is equal to the inclination angle of the first rake portions 21. The arcuate major cutting edges 51 are used as major cutting edges. In the center of each arcuate major cutting edge 51, a large region functioning as a rake in the upper surface 2 can be secured. Therefore, the stability of the direction in which generated chips are ejected can be improved.

In this example, specifically, the angle between a virtual extension line R1 of the end of the stepped portion 24 shown in FIG. 4 nearer to the arcuate major cutting edge 51 and the reference plane h1 parallel to a horizontal plane passing through the arcuate major cutting edge 51 is denoted as $\gamma 1$. The angle between a virtual extension line R2 of the end of the stepped portion 24 shown in FIG. 5 nearer to the arcuate major cutting edge 51 and the reference plane h1 parallel to a horizontal plane passing through the arcuate major cutting edge 51 is denoted as $\gamma 2$. The angle between a virtual extension line R3 of the end of the stepped portion 24 shown in FIG. 6 nearer to the arcuate major cutting edge 51 and the reference plane h1 parallel to a horizontal plane passing through the arcuate major cutting edge 51 is denoted as $\gamma 3$. In FIG. 4 to FIGS. 6, $\gamma 1 > \gamma 2 > \gamma 3$, and $\gamma 2 = \alpha 2$. The angle $\gamma$ is appropriately set from the range of 10° to 70°.

As shown in FIG. 2, the stepped portion 24 is nearest to the inside of the main body portion in the regions corresponding to the centers of the arcuate major cutting edges 51. The stepped portion 24 is farthest from the inside of the main body portion in the regions corresponding to both ends of the plurality of arcuate major cutting edges 51. The arcuate major cutting edges 51 are used as major cutting edges. In the center of each arcuate major cutting edge 51, a large region functioning as a rake in the upper surface 2 can be secured. Therefore, the stability of the direction in which generated chips are ejected can be improved.

As shown in FIG. 2, the upper surface 2 has a screw contact portion 8 around the through-hole 7. The screw contact portion 8 comes into contact with the screw head of an attaching screw, and has the same shape as the contact surface of the attaching screw. When the attaching screw is attached to the through-hole 7, the screw contact portion 8 and the contact surface of the screw head come into close contact with each other. With this configuration, the formation of a gap between the screw head and the upper surface 2 is prevented, and chips are prevented from sticking in the gap.

In this case, it is preferable that the screw contact portion 8 be located at the same height as the cutting edge 5 or located at a position lower than the cutting edge 5. In this example, as shown in FIG. 4 to FIG. 6, the screw contact portion 8 is located at a position lower than the cutting edge 5. With this configuration, the position where the screw head of the attaching screw and the screw contact portion 8 are in contact with each other is lower than the cutting edge 5, and therefore chips are less likely to be stuck between the screw head of the attaching screw and the screw contact portion 8.

As shown in FIG. 1, the angle between the upper surface 2 and the side surface 4 becomes larger as moving from the arcuate major cutting edge 51 toward the arcuate minor cutting edge 52. That is, the clearance angle becomes larger as moving from the arcuate major cutting edge 51 toward the arcuate minor cutting edge 52. With this configuration, the cutting edge strength can be easily kept balanced and chatter vibration can be prevented by changing the clearance angle in accordance with the cutting force to which the cutting edge 5 is subjected. In this example, as shown in FIG. 4, the clearance angle is 0° in a cross section in the normal direction of the center of each arcuate major cutting edge 51. As shown in FIG. 7, the clearance angle is an acute angle in a cross section in the normal direction of the center of each arcuate minor cutting edge 52.

Here, as shown in FIG. 4 to FIG. 9, in side view, clearance angle is inclination angle $\theta 1$, $\theta 2$ of the side surface 4 with respect to auxiliary line V1, V2 perpendicular to reference plane h1, h2, respectively. Although clearance angle θ1, θ2 is not particularly limited, it is preferably within a range of 0° to 15°, and may be appropriately set within this range. Specifically, in this example, clearance angle changes smoothly from the arcuate major cutting edge 51 toward the arcuate minor cutting edge 52 such that θ1 in FIG. 5=0° and θ2 in FIG. 8=8°.

The side surface 4 has recessed constraining portions. The constraining portions include first constraining portions 41 located under the arcuate major cutting edges 51, and second constraining portions 42 located under the arcuate minor cutting edges 52. The first constraining portions 41 are inclined toward the inside of the main body portion 10 as moving from the lower surface 3 toward the upper surface 2. The second constraining portions 42 are inclined toward the outside of the main body portion 10 as moving from the lower surface 3 toward the upper surface 2. With this configuration, the arcuate major cutting edges 51 can be indexed using the first constraining portions 41. Therefore, the arcuate minor cutting edges 52 can be accurately indexed using the second constraining portions 42, and the insert 1 is less likely to be detached from the holder.

In this example, as shown in FIG. 3, in side view, the first constraining portions 41 are located under the arcuate major cutting edges 51. In side view, the second constraining portions 42 are located under the arcuate minor cutting edges 52. With this configuration, the arcuate major cutting edges 51 and the arcuate minor cutting edges 52 can be accurately indexed and can be used for cutting.

In this example, as shown in FIG. 4, the first constraining portions 41 are inclined so as to approach the rotation center axis S1 as moving from the lower surface 3 toward the upper surface 2. As shown in FIG. 7, the second constraining portions 42 are inclined away from the rotation center axis S1 as moving from the lower surface 3 toward the upper surface 2. With this configuration, the force to which the first constraining portions 41 are subjected from the holder in contact therewith is in a direction from the upper surface 2 toward the lower surface 3, and therefore the insert 1 is less likely to be detached from the holder.

Specifically, as shown in FIG. 4, the value of the inclination angle 6 of the first constraining portions 41 with respect to a line l1 parallel to the rotation center axis S1, and the value of the inclination angle ϕ of the second constraining portions 42 with respect to a line l2 parallel to the rotation center axis S1 are both preferably 2° to 15°. Furthermore, as in this example, the value of the inclination angle δ and the value of the inclination angle ϕ are preferably equal to each other. With this configuration, the upper surface 2 of the insert 1 can be used as a lower surface 3, and the lower surface 3 can be used as an upper surface 2, and therefore the economical efficiency is improved.

Figure 10:
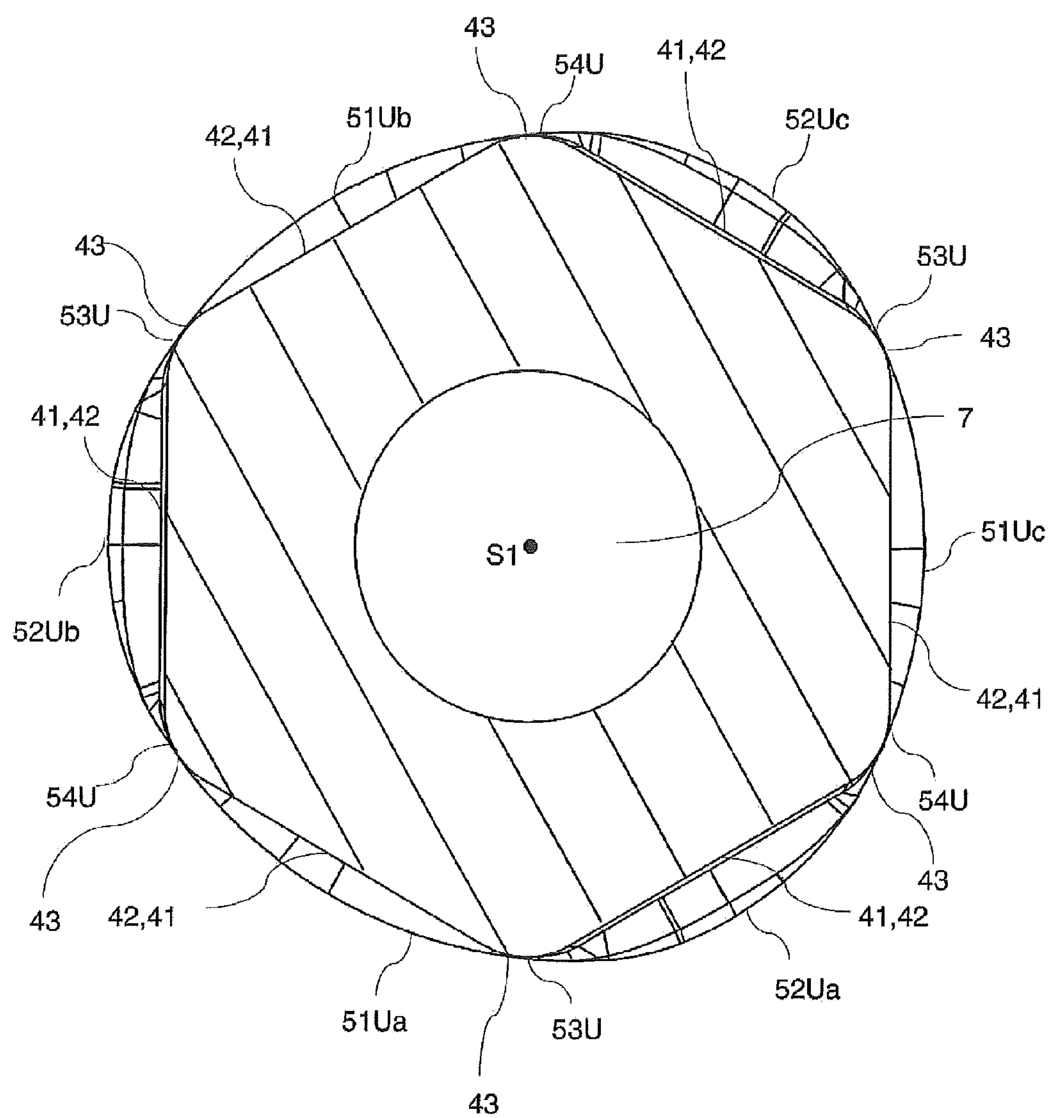
FIG. 10 is a sectional view of the cutting insert shown in FIG. 3 taken along line I-I.

Furthermore, in this example, as shown in FIG. 10, the first constraining portions 41 and the second constraining portions 42 are arranged so as to form a regular hexagon centered at the rotation center axis S1. With this configuration, the rotational moment in the first constraining portions 41 is equal to the rotational moment in the second constraining portions 42, and the rotation of the insert 1 can be prevented.

In this example, from the viewpoint of maintaining the strength of the insert 1, in order to smoothly connect the first constraining portions 41 and the second constraining portions 42, continuous surfaces 43 are provided. In this example, the first constraining portions 41 are located under the centers of the arcuate major cutting edges 51, and the continuous surfaces 43 are located under the ends of the arcuate major cutting edges 51. As shown in FIG. 4 and FIG. 7, the inclination angle of the continuous surfaces 43 with respect to the rotation center axis is not particularly limited.

When the insert 1 is attached to the holder, the lower surface 3 functions as a surface for contact with the holder. Therefore, the shape of the lower surface 3 is not particularly limited as long as the lower surface 3 is perpendicular to the rotation center axis S1.

Figure 11:
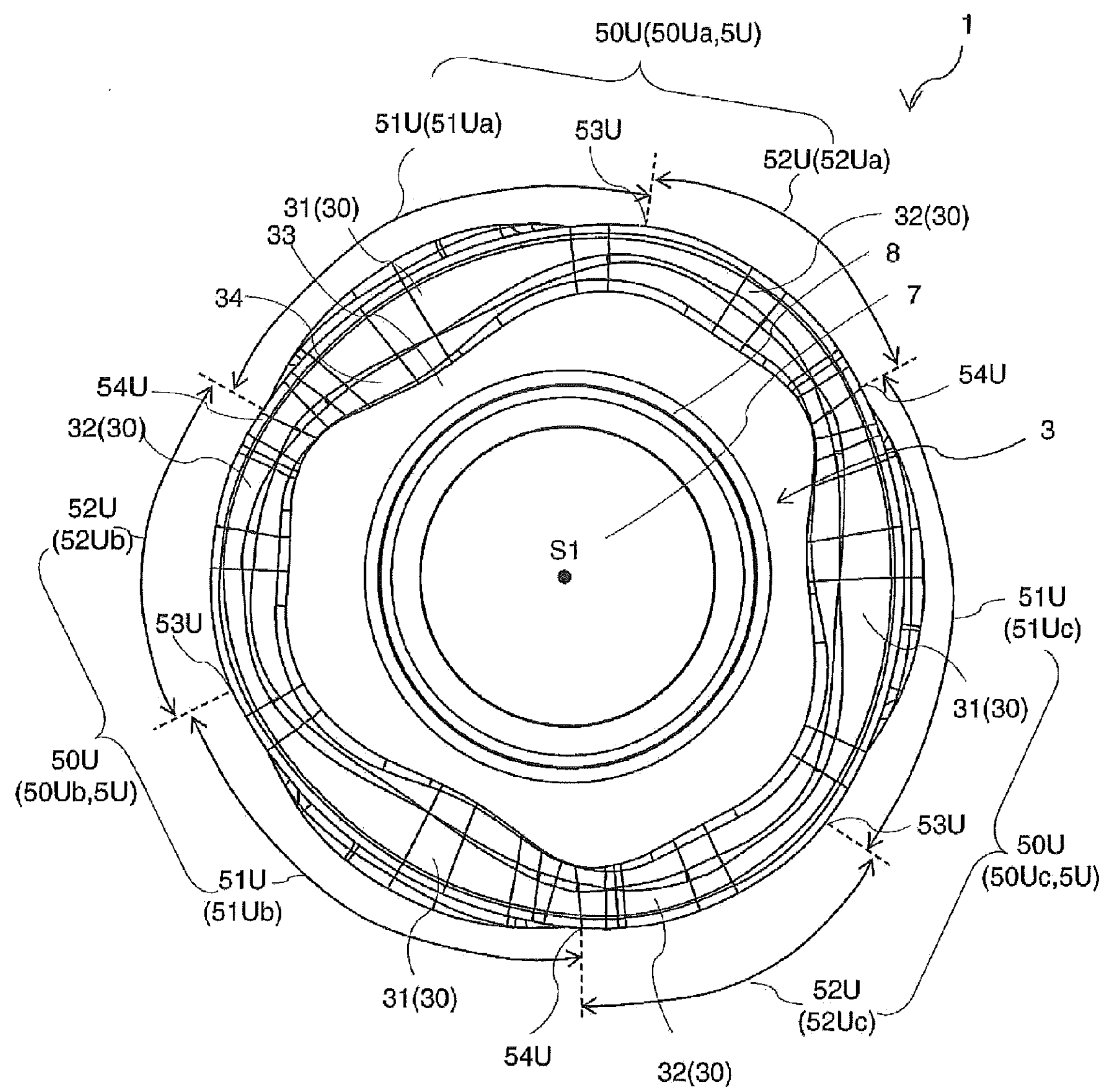
FIG. 11 is a bottom view of the cutting insert shown in FIG. 1.

In this example, the lower surface 3 has a shape obtained by rotating the upper surface 2 180 degrees about a straight line perpendicular to the rotation center axis S1. That is, as shown in FIG. 11, as with the upper surface 2, the lower surface 3 includes first rake portions 31, second rake portions 32, a flat surface 33, and a stepped portion 34. With this configuration, the insert 1 can be used as a so-called double-sided insert.

As shown in FIG. 11, the main body portion 10 has a lower cutting edge 5U at the intersection of the lower surface 3 and the side surface 4. The lower cutting edge 5U includes arcuate lower major cutting edges 51U that are convex toward the outside of the main body portion 10, and arcuate lower minor cutting edges 52U that are convex toward the outside of the main body portion 10. The curvature radius r2 of the arcuate lower minor cutting edges 52U is smaller than the curvature radius r1 of the arcuate lower major cutting edges 51U. In this example, as shown in FIG. 11, the cutting edge 5U has three cutting portions (50Ua, 50Ub, 50Uc) each including one arcuate lower major cutting edge 51U and one arcuate lower minor cutting edge 52U. That is, the lower cutting edge 5U has three arcuate lower major cutting edges 51U (51Ua, 51Ub, 51Uc) and three arcuate lower minor cutting edges 52U (52Ua, 52Ub, 52Uc). Therefore, the insert 1 is a six-corner type insert.

The curvature radius of the arcuate minor cutting edges 52 is smaller than the curvature radius of the arcuate lower major cutting edges 51U. Therefore, even when the axial rake is negative, the arcuate lower major cutting edges 51U are prevented from interfering with the workpiece. Therefore, sinking machining in which the cutting edge 5 moves in both the direction parallel to the surface of the workpiece and the direction perpendicular thereto and performs cutting can be well performed.

The flat surface 33 in the lower surface 3 serves as a support surface when the insert 1 is in contact with the holder. In this example, the flat surface 33 in the lower surface 3 is nearest to the arcuate lower minor cutting edges 52U. With this configuration, a large flat surface 33 can be secured in the lower surface 3 when the insert 1 is attached to the holder. Therefore, the cutting force to which the arcuate major cutting edges 51 are subjected can be received, and cutting constraining force can be improved and chatter vibration can be prevented.

<Cutting Holder>

Figure 12:
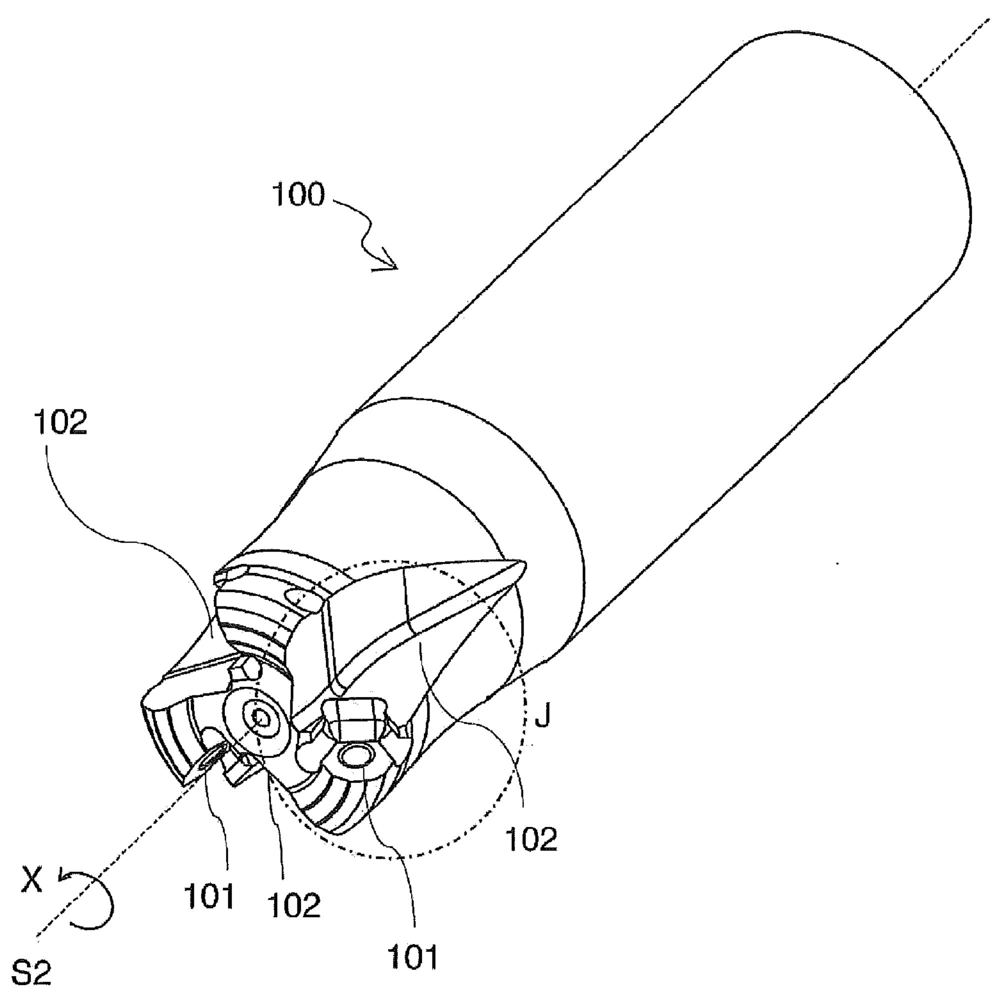
FIG. 12 is a perspective view showing an example of an embodiment of a cutting holder of the present invention.

As shown in FIG. 12, a cutting holder 100 that is an example of an embodiment of the present invention has insert pockets 101 formed in the outer peripheral surface of a cylindrical support main body portion having a rotation center axis S2.

Figure 13:
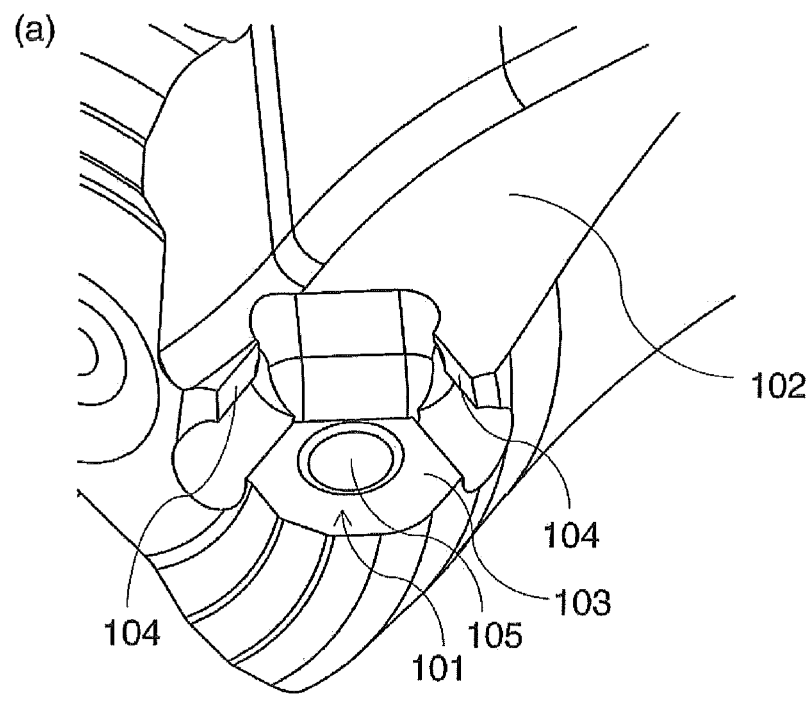
FIG. 13 (*a*) is a partial enlarged perspective view of the region J shown in FIG. 12.
Figure 13:
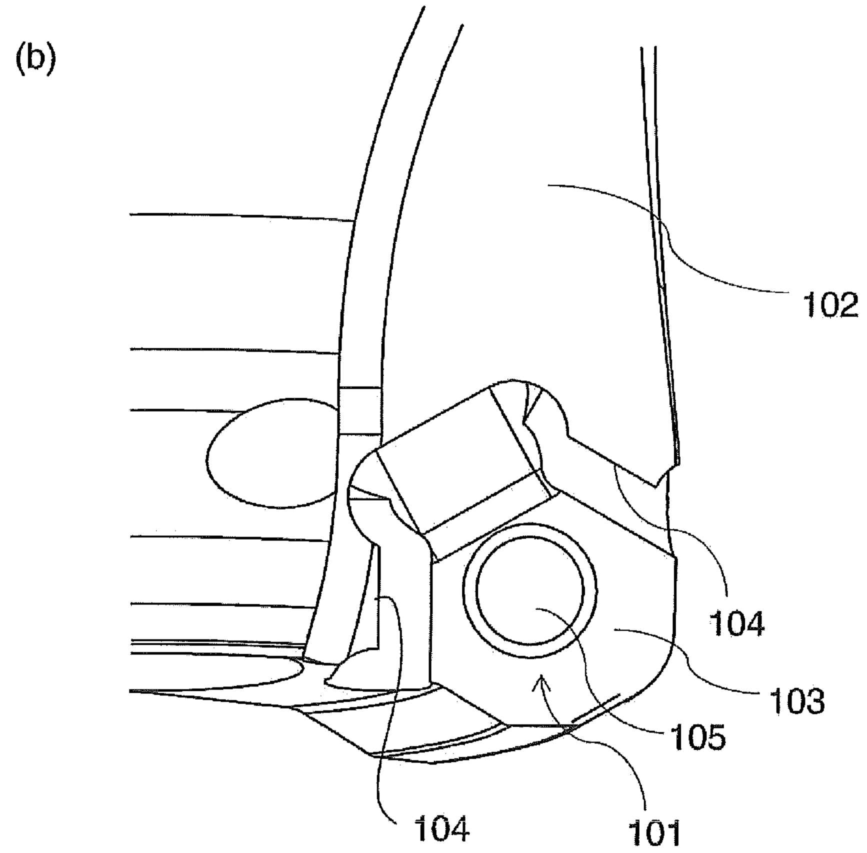

As shown in FIG. 13, the insert pockets 101 each have a seating surface 103 facing the rotational direction, and a plurality of constraining side surfaces 104 located in directions intersecting with the seating surface 103. The plurality of constraining side surfaces 104 are each inclined so as to approach a perpendicular of the seating surface 103 with increasing distance from the seating surface 103. The seating surface 103 is provided with a screw hole 105 into which an attaching screw (not shown) is screwed when the insert 1 is attached to the holder 100. The seating surface 103 is in contact with the flat surface 23 of the insert 1. The plurality of constraining side surfaces 104 are in contact with the first constraining portions 41 of the insert 1.

With this configuration, the constraining side surfaces 104 are inclined so as to approach a perpendicular I3 of the seating surface 103 with increasing distance from the seating surface 103. Therefore, the constraining surfaces 104 are less likely to be subjected to the resistance force due to screwing the attaching screw into the insert 1 when the insert 1 is constrained. Therefore, the lower surface 3 of the insert 1 and the seating surface 103 come into contact with each other more easily, and the insert 1 is constrained stably. In this example, the inclination angle of the constraining side surfaces 104 are equal to the inclination angle of the first constraining portions 41. With this configuration, the constraining side surfaces 104 and the first constraining portions 41 come into contact with each other more surely.

Further, as shown in FIG. 13, the plurality of constraining side surfaces 104 are arranged so as to intersect with each other in plan view. With this configuration, even in the case of machining in which thrust force is large, such as machining of a difficult-to-cut material, the rotation of the insert can be prevented.

In this example, in order to maintain the stability of the chip ejection direction, chip ejection pockets 102 are provided. As shown in FIG. 12, from the viewpoint of improving the stability of the chip ejection direction, the chip ejection pockets 102 are preferably formed so as to be continuous with the rear ends of the insert pockets 101.

<Cutting Tool>

Figure 14:
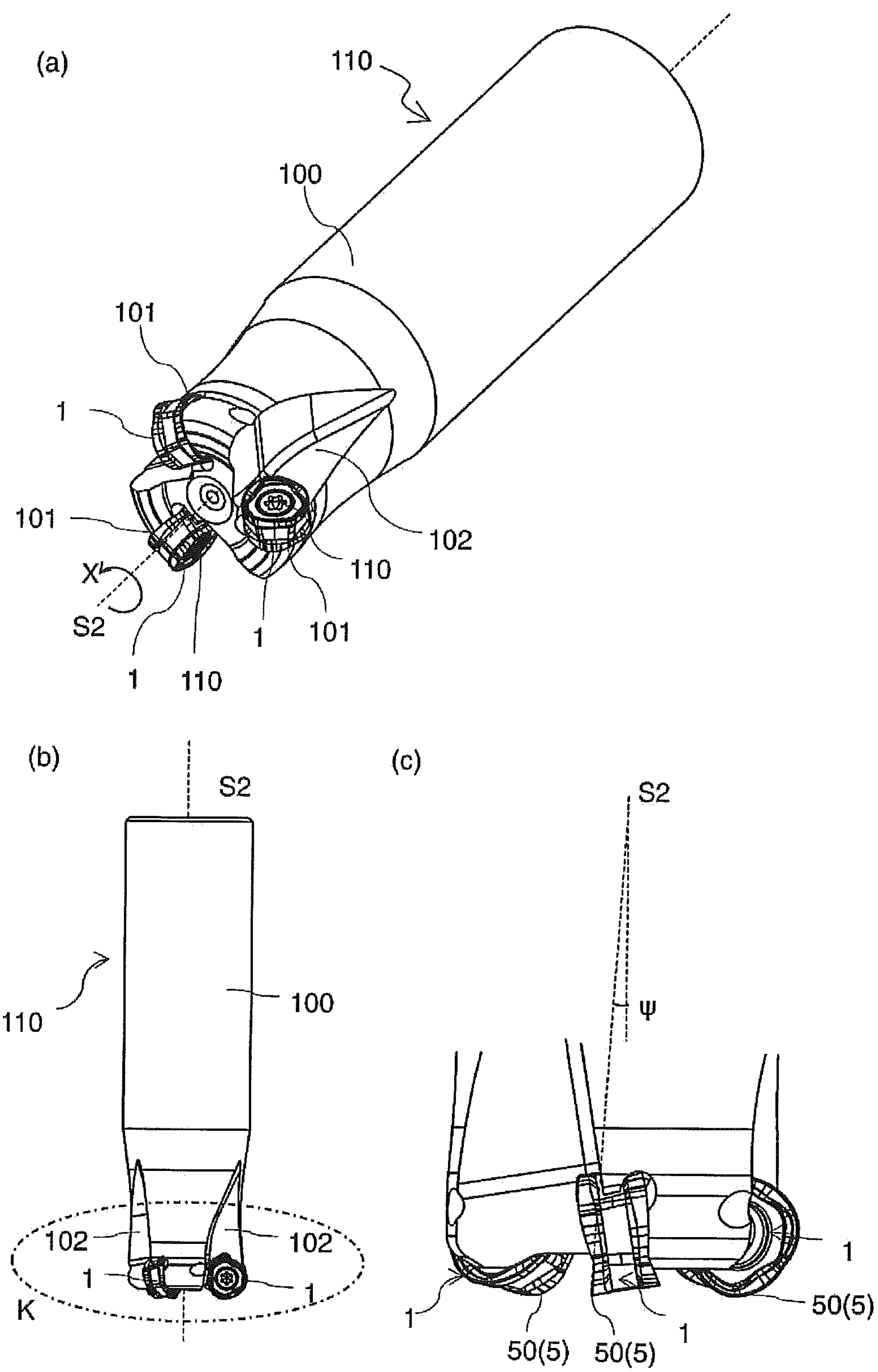
FIG. 14 (*a*) is a perspective view showing an example of an embodiment of a cutting tool of the present invention.

As shown in FIG. 14, a cutting tool 110 that is an example of an embodiment of the present invention includes a cutting holder 100, and cutting inserts 1 attached to insert pockets 101. The cutting inserts 1 are attached to the holder 100 such that arcuate major cutting edges 51 protrude from the outer peripheral surface of the holder 100. That is, with this configuration, the arcuate major cutting edges 51 are constrained at positions that are most protruded from the outer peripheral surface of the holder 100 at the time of cutting, and the effect of the insert 1 of the present invention can be well exhibited.

In this example, as shown in FIG. 14, the inserts 1 are attached to the insert pockets 101 with attaching screws 111. That is, each insert 1 is attached to the holder 100 by inserting an attaching screw 111 into the through-hole 7 of the insert 1, inserting the tip of the attaching screw 111 into a screw hole formed in one of the insert pockets 101, and engaging the threads (not shown) with each other.

In this example, as shown in FIG. 14 (*c*), the inserts 1 are attached to the holder 100 such that the arcuate major cutting edges 51 have a positive axial rake Ψ with respect to the rotation center axis S2 of the holder 100. That is, as shown in FIG. 14 (*c*), in side view, the cutting edges 5 of the inserts 1 disposed on the outer peripheral surface side of the holder 100 are inclined away from the rotation center axis S2 of the holder 100 from the front end of the holder 100 toward the rear end thereof. With this configuration, the cutting resistance applied at the time of cutting can be reduced, and chatter vibration can be prevented. As a result, the fracture of the cutting edges 5 can be prevented.

<Method Of Manufacturing Machined Product>

Figure 15:
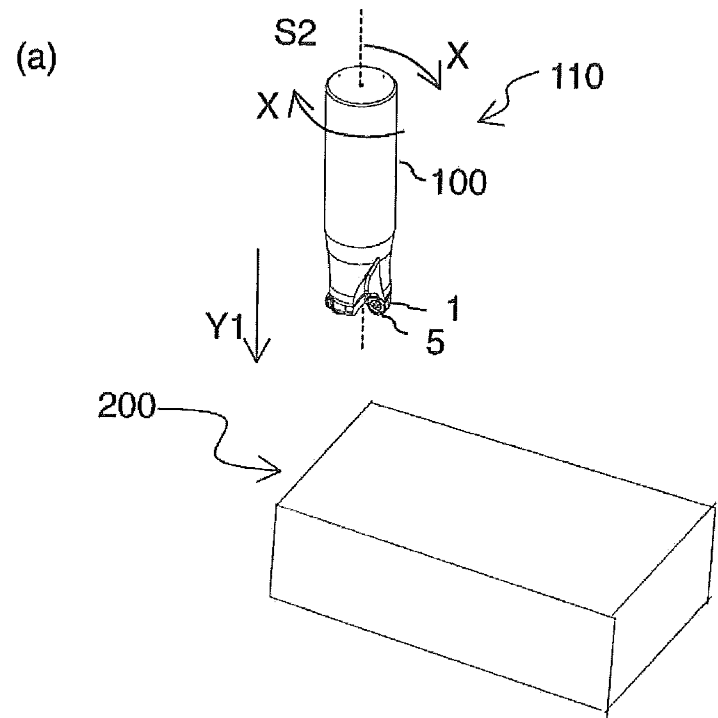
FIG. 15 is a process flow diagram illustrating an example of an embodiment of a method of cutting a workpiece of the present invention.
Figure 15:
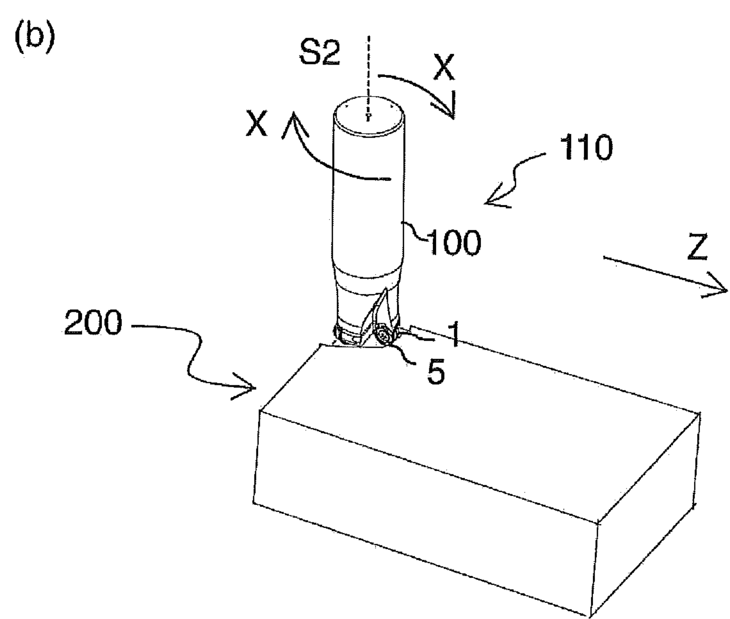
Figure 15:
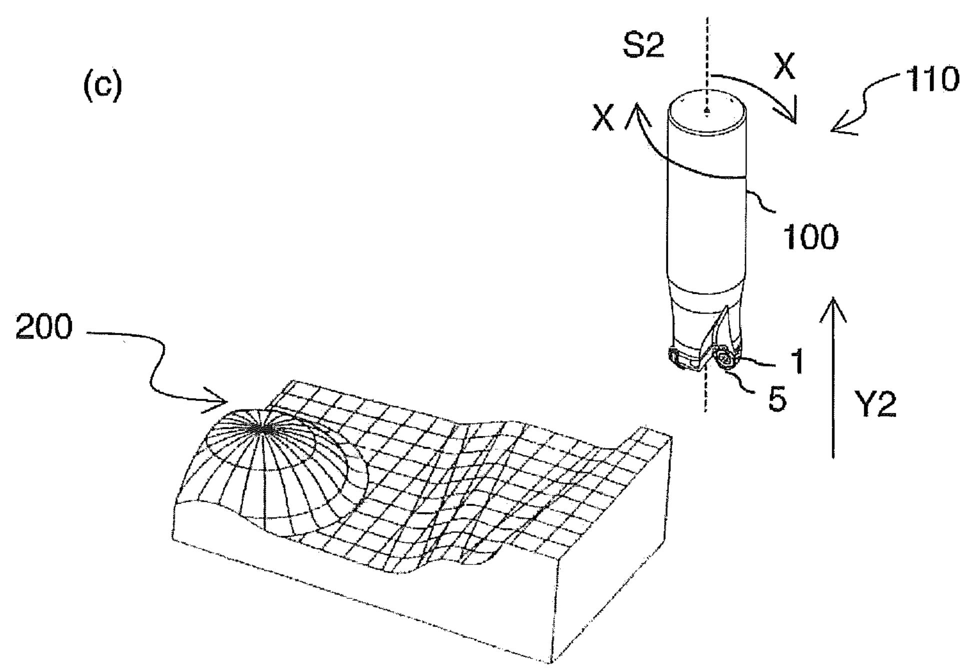

With reference to FIG. 15, a method of manufacturing a machined product that is an example of an embodiment of the present invention will be described, by taking the case of using the cutting tool 10. The method of manufacturing a machined product of this example includes the following steps (i) to (iii):

(i) the step of rotating the cutting tool 110 in the direction of arrow X about the rotation center axis S2 of the holder 100 as shown in FIG. 15 (*a*), and the step of moving the cutting edges 5 of the cutting tool 110 nearer to a workpiece 200 by moving the cutting tool 110 in the direction of arrow Y1;

(ii) the step of bringing the cutting edges 5 of the inserts 1 into contact with the surface of the workpiece 200, moving the rotating cutting tool 110, for example, in the direction of arrow Z, and cutting the surface of the workpiece 200 as shown in FIG. 15 (*b*); and (iii) the step of moving the rotating cutting tool 110 in the direction of arrow Y2, and thereby separating the cutting tool 110 from the workpiece 200 as shown in FIG. 15 (*c*).

By cutting the workpiece 200 using the cutting tool 110 as described above, a machined product is manufactured.

In the step (i), the cutting tool 110 and the workpiece 200 merely need to be moved relatively nearer to each other. For example, the workpiece 200 may be moved nearer to the cutting tool 110. Similarly, in the step (iii), the workpiece 200 and the cutting tool 110 merely need to be moved relatively away from each other. For example, the workpiece 200 may be moved away from the cutting tool 110. When the cutting is continued, the step of bringing the cutting edges 5 of the inserts 1 into contact with a different location of the workpiece 200 may be repeated while maintaining a state where the cutting tool 110 is being rotated. In this example, the cutting edge 5 of each insert 1 has three cutting portions as described above. Therefore, when the cutting portion (cutting edge 5) in use is worn, the insert 1 is rotated about the rotation center axis S1 of the through-hole 7, and an unused cutting portion (cutting edge 5) is used.

Typical examples of the material of the workpiece 200 include carbon steel, alloy steel, stainless steel, cast iron, and nonferrous metal.

REFERENCE SIGNS LIST

1 cutting insert (insert)
2 upper surface
20 rake surface
21 first rake portion
22 second rake portion
23 flat surface
24 stepped portion
3 lower surface
30 rake surface on lower surface side
31 first rake portion on lower surface side
32 second rake portion on lower surface side
33 flat surface on lower surface side
34 stepped portion on lower surface side
4 side surface
41 first constraining portion
42 second constraining portion
43 continuous surface
5 cutting edge
50 cutting portion
51 arcuate major cutting edge
52 arcuate minor cutting edge
53 highest point
54 lowest point
5U lower cutting edge
50U cutting portion on lower cutting edge side
51U arcuate lower major cutting edge

52U arcuate lower minor cutting edge
53U highest point on lower cutting edge side
54U lowest point on lower cutting edge side
6 land
7 through-hole
8 screw contact portion
10 main body portion
100 holder
101 insert pocket
102 chip ejection pocket
103 seating surface
104 constraining side surface
105 screw hole
110 cutting tool
111 attaching screw
200 workpiece

The invention claimed is:

1. A cutting insert comprising:

a main body portion comprising:

an upper surface;

a lower surface;

a side surface connected to the upper surface and the lower surface;

a cutting edge located at an intersection of the upper surface and the side surface;

a first rake portion on the upper surface; and a flat surface located nearer to the inside of the main body portion than the first rake portion;

wherein the cutting edge comprises:

a first cutting edge that is arcuate and convex toward outside of the main body portion; and a second cutting edge that is arcuate and convex toward outside of the main body portion and that has a curvature radius smaller than a curvature radius of the first cutting edge, wherein the first rake portion is inclined to extend toward the lower surface as viewed in a direction from the first cutting edge toward an inside of the main body portion and is located along the first cutting edge, wherein an inclination angle of the first rake portion becomes smaller as moving from a part continuous with one end of the first cutting edge toward a part continuous with another end of the first cutting edge, and in plan view, the flat surface is farther from the first cutting edge in a center of the first cutting edge than in a both end of the first cutting edge.

2. The cutting insert according to claim 1, wherein the first cutting edge is inclined so as to approach the lower surface with increasing distance from the second cutting edge, and the second cutting edge is inclined so as to approach the lower surface with increasing distance from the first cutting edge.

3. The cutting insert according to claim 1, wherein a highest point of the cutting edge that is farthest from the lower surface is located between the first cutting edge and the second cutting edge.

4. The cutting insert according to claim 1, wherein, in side view, the first cutting edge and the second cutting edge are curved toward a side away from the lower surface.

5. The cutting insert according to claim 1, wherein, in plan view, the first rake portion is closer to the inside of the main body portion in a region corresponding to the center of the first cutting edge than in regions corresponding to both ends of the first cutting edge.

6. The cutting insert according to claim 1, wherein, in plan view, the first cutting edge is longer than the second cutting edge.

7. The cutting insert according to claim 1, wherein the upper surface comprises, along the second cutting edge, a second rake portion that is inclined to extend towards the lower surface as viewed in a direction from the second cutting edge toward the inside of the main body portion, and wherein an inclination angle of the second rake portion becomes smaller decreases along a path from a part continuous with one end of the second cutting edge toward a part continuous with the center of the second cutting edge.

8. The cutting insert according to claim 7, wherein the inclination angle of the second rake portion becomes smaller from the part continuous with one end of the second cutting edge toward the part continuous with the other end of the first cutting edge.

9. The cutting insert according to claim 7, wherein, in plan view, a width of the second rake portion as viewed in a direction from the second cutting edge to the inside of the main body portion is substantially constant.

10. A cutting insert comprising:

a main body portion comprising:

an upper surface;

a lower surface;

a side surface connected to the upper surface and the lower surface;

a cutting edge located at an intersection of the upper surface and the side surface; and a first rake portion on the upper surface and a flat surface located nearer to the inside of the main body portion than the first rake portion;

wherein the cutting edge comprises:

a first cutting edge that is arcuate and convex toward outside of the main body portion; and a second cutting edge that is arcuate and convex toward outside of the main body portion and that has a curvature radius smaller than a curvature radius of the first cutting edge, wherein the first rake portion is inclined to extend toward the lower surface as viewed in a direction from the first cutting edge toward an inside of the main body portion and is located along the first cutting edge, wherein an inclination angle of the first rake portion becomes smaller as moving from a part continuous with one end of the first cutting edge toward a part continuous with another end of the first cutting edge in plan view, the flat surface is farther from the first cutting edge in a center of the first cutting edge than in a both end of the first cutting edge, wherein, in side view, the side surface comprises a recessed constraining portion, wherein the constraining portion comprises:

a first constraining portion located under the first cutting edge; and a second constraining portion located on a side of the first constraining portion and under the second cutting edge, and wherein the first constraining portion is inclined toward the inside of the main body portion as viewed in a direction from the lower surface toward the upper surface, and the second constraining portion is inclined toward the outside of the main body portion as viewed in a direction from the lower surface toward the upper surface.

11. The cutting insert according to claim 1, wherein the main body portion comprises a through-hole penetrating the upper surface and the lower surface, and wherein the cutting edge comprises a plurality of cutting portions each of which comprising the first cutting edge and the second cutting edge around the through-hole.

12. A cutting tool comprising:

the cutting insert according to claim 1; and a cylindrical holder having a center rotational axis, wherein the cutting insert is attached to the holder such that the first cutting edge protrudes from an outer peripheral surface of the holder.

13. The cutting tool according to claim 12, wherein the cutting insert is attached to the holder such that the first cutting edge has a positive axial rake with respect to the center rotational axis of the holder.

14. A method of manufacturing a machined product, the method comprising steps of:

rotating the cutting tool according to claim 12;

bringing the cutting edge of the rotating cutting tool into contact with a workpiece and cutting the workpiece; and separating the cutting edge of the rotating cutting tool from the workpiece.

* * * * *